(12) United States Patent
Kong et al.

(10) Patent No.: US 8,973,718 B2
(45) Date of Patent: Mar. 10, 2015

(54) CALIPER PARKING BRAKE

(71) Applicant: Mando Corporation, Pyeongtaek-si, Gyeonggi-do (KR)

(72) Inventors: Young Hun Kong, Gunpo-si (KR); Seon Ki Hong, Seoul (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 2 days.

(21) Appl. No.: 13/901,499

(22) Filed: May 23, 2013

(65) Prior Publication Data

US 2014/0020991 A1   Jan. 23, 2014

(30) Foreign Application Priority Data

Jul. 20, 2012 (KR) ........................ 10-2012-0079373

(51) Int. Cl.
| | |
|---|---|
| *F16D 65/56* | (2006.01) |
| *F16D 55/226* | (2006.01) |
| *F16D 65/18* | (2006.01) |
| *F16D 65/00* | (2006.01) |
| *F16D 121/02* | (2012.01) |
| *F16D 121/04* | (2012.01) |

(52) U.S. Cl.
CPC .............. *F16D 55/226* (2013.01); *F16D 65/18* (2013.01); *F16D 65/567* (2013.01); *F16D 65/0075* (2013.01); *F16D 2121/02* (2013.01); *F16D 2121/04* (2013.01)

USPC .......................................... 188/72.8; 188/71.9

(58) Field of Classification Search
USPC ............................... 188/72.7–72.9, 71.8, 71.9
See application file for complete search history.

(56) References Cited

U.S. PATENT DOCUMENTS

| | | | | |
|---|---|---|---|---|
| 6,651,784 B1* | 11/2003 | Barbosa et al. | ............... | 188/71.9 |
| 2009/0107777 A1* | 4/2009 | Kim | ............... | 188/72.7 |
| 2011/0278106 A1* | 11/2011 | Kim | ............... | 188/72.1 |

* cited by examiner

*Primary Examiner* — Christopher Schwartz
(74) *Attorney, Agent, or Firm* — McDermott Will & Emery LLP

(57) ABSTRACT

A caliper parking brake including: caliper housing having one end on which a cylinder is formed and the other end on which a fork is formed to face the cylinder; brake force input terminal rotatably mounted on an end of the cylinder by a parking cable; brake force switching terminal installed within the cylinder on a common axis so as to rotate together with the brake force input terminal; brake force output terminal directly connected to the brake force switching terminal on a common axis; and a brake terminal that is disposed between the fork and the brake force output terminal and stops rotation of a brake disc using the brake force output by the brake force output terminal, wherein the brake force output terminal compensates for abrasion that occurs in the fork and a frictional pad of the piston by moving an initial position of the piston forward.

9 Claims, 5 Drawing Sheets

-- Prior Art --

CALIPER PARKING BRAKE

CROSS-REFERENCE TO RELATED PATENT APPLICATION

This application claims the benefit of Korean Patent Application No. 10-2012-0079374, filed on Jul. 20, 2012 in the Korean Intellectual Property Office, the disclosure of which is incorporated herein in its entirety by reference.

BACKGROUND OF THE INVENTION

1. Field of the Invention

The present invention relates to a caliper parking brake, and more particularly, a caliper parking brake in which a returning force of a piston that returns to a position before brake when brake is released according to a strength of a brake pressure applied to a brake force output terminal increases so that drag that occurs in a brake disc due to non-return of a frictional pad pressurized by the piston can be removed or reduced.

2. Description of the Related Art

In general, caliper-type parking brakes are brakes that perform a brake operation by pressurizing and stopping a brake disc interposed between a piston and a frictional pad of a fork with a brake force applied to the piston, wherein a rotatative force of a brake lever that rotates by a parking cable during the brake operation is switched to a straight motion, thus generating the brake force of the piston.

In this case, caliper parking brakes can be classified in various manners according to a method of switching a rotatative motion of the brake lever to the straight motion. Thus, representative examples thereof may be ball in ramp (BIR) type caliper parking brakes.

In BIR type caliper parking brakes, uneven parts are formed on matching planes between an input ramp that rotates in synchronization with rotation of the brake lever and an output ramp that is installed to correspond to the input ramp, and a ball or roller is interposed between the matching planes so that, when the input ramp rotates, movement of the ball or roller that moves forward and backward according to rotation of uneven surfaces is transmitted to the output ramp without any change and a rotatative motion of the input ramp is switched to a straight motion of the output ramp, thus generating a brake force.

Meanwhile, in the above-described BIR type caliper parking brake according to the related art, when brake is performed, a piston 103 moves forward within a cylinder 101 and pressurizes a frictional pad 105 against a brake disc, as illustrated in FIG. 1. Thus, in this case, a sealing ring 107 that is closely adhered to an outer circumferential surface of the piston 103 is pushed along the piston 103 and thus is deformed. Thus, when brake is released, the deformed sealing ring 107 is restored to its original shape by its elastic restoring force, and in this procedure, the piston 103 that is closely adhered to the sealing ring 107 is returned to its original position.

However, in the BIR type caliper parking brake according to the related art in which, when brake is released, the sealing ring 10 is returned to its original position by its elasticity, even when a strong brake force is exerted on the piston 103, the sealing ring 107 is excessively deformed and loses part of a restoring force and thus brake is released, the piston 103 cannot be returned to its original position. As a result, quick return of the frictional pad 105 is disturbed, and although brake has been released, the frictional pad 105 and the brake disc are maintained in a contact state, which results in drag.

In addition, when abrasion occurs in the frictional pad 105 due to friction with the brake disc, in an initial stage of brake in which the piston 105 moves forward and starts pressurizing the frictional pad 105, the frictional pad 105 does not contact the brake disc so that substantial brake is not performed, and even in maximum pressure brake in which the piston moves forward to the maximum and pressurizes the frictional pad 105 against the brake disc to the maximum, a brake defect in which a brake pressure does not substantially reach a maximum pressure, occurs.

SUMMARY OF THE INVENTION

The present invention provides a caliper parking brake in which a repulsive force of a return spring compressed by a piston that moves forward for brake in correspondence to the magnitude of a brake pressure applied to the piston is switched and a restoring force of the return spring applied to the piston when brake is released is switched so that, even when a strong brake force is applied to the piston, the piston can be returned to its original position, thus preventing drag from occurring in a brake disc due to non-return of the piston and a frictional pad pressurized by the piston.

The present invention also provides a caliper parking brake in which a gap between a brake disc and a frictional pad that is generated by abrasion of the frictional pad is compensated for within a brake in real-time so that a brake defect caused by non-contact between the brake disc and the frictional pad can be prevented in advance.

According to an aspect of the present invention, there is provided a caliper parking brake including: a caliper housing having one end on which a cylinder is formed and the other end on which a fork is formed to face the cylinder; a brake force input terminal that is rotatably mounted on an end of the cylinder of the caliper housing by a parking cable; a brake force switching terminal that is installed within the cylinder on a common axis so as to rotate together with the brake force input terminal and switches a rotatative motion caused by a brake force introduced into the brake force input terminal to a straight motion; a brake force output terminal that is directly connected to the brake force switching terminal on a common axis and outputs the brake force switched to the straight motion by the brake force switching terminal; and a brake terminal that is disposed between the fork and the brake force output terminal and stops rotation of a brake disc using the brake force output by the brake force output terminal, wherein the brake force output terminal compensates for abrasion that occurs in the fork and a frictional pad of the piston by moving an initial position of the piston forward.

The brake force output terminal may include: a piston that is mounted on a front end of the cylinder and pressurizes the brake disc against the fork by the straight motion transmitted from the brake force switching terminal during brake so as to perform brake; an abrasion compensation rod part that is mounted within the piston on a common axis, extends in an axial direction when abrasion occurs in the fork and the frictional pad of the piston and increases a distance at which the piston pressurizes the brake disc and moves, so as to compensate for abrasion; and a return spring part that is disposed within the cylinder on a common axis to the abrasion compensation rod part, is elastically compressed during brake and is elastically restored while brake is released such that the abrasion compensation rod part is returned to its original position before brake.

The return spring part may include low-pressure and high-pressure springs that are arranged in parallel on a common axis, and when a brake pressure transmitted from the brake force input terminal is low, the low-pressure spring may be compressed, when the brake pressure is high, the low-pressure and high-pressure springs may be compressed, and when brake is released, the piston may be returned to a position before brake by an elastic repulsive force of the low-pressure spring or elastic repulsive forces of the low-pressure and high-pressure springs.

The abrasion compensation rod part may include: a return pipe that elastically compresses the return spring part and moves forward when the return pipe is pressurized by the brake force switching terminal and is returned to a state before pressurization by a repulsive force of the return spring part when a pressurized force caused by the brake force switching terminal is released; an adjustment rod that is one-direction screw coupled to a front end of the return pipe so as to move relative to the return pipe only in an extension direction, if, as the piston moves forward, a gap between a front end surface of the adjustment rod and an inner circumferential surface of the piston is generated, moves forward from the return pipe by the gap; and an abrasion compensation spring, a rear end of which is hung in the inner circumferential surface of the piston, a front end of which is hung in the adjustment rod so as to elastically support the adjustment rod with respect to the piston such that a front end of the adjustment rod is closely adhered to the inner circumferential surface of the piston.

The return spring part may include: a spring cage that constitutes an exterior of the return spring part, is inserted into an outer circumference of the return pipe on a common axis and is hung in and fixed to the inner circumferential surface of the piston; the low-pressure spring that is mounted on a common axis to the return pipe so as to be interposed between a flange of the return pipe and a bottom surface of the spring cage; and the high-pressure spring that is inserted into a circumference of the low-pressure spring on a common axis, is mounted between the flange and the spring cage and is configured in such a way that the flange compresses the low-pressure spring, moves forward by a gap and then pressurization starts being performed by the flange.

The caliper parking brake may further include a support ring plate that is inserted into the outer circumference of the return spring on a common axis, supports a rear end of the high-pressure spring and starts being pressurized by the flange when contacting the flange that compresses the low-pressure spring and moves forward by the gap.

The caliper parking brake may be used as a foot brake by connecting a brake line of the foot brake to the cylinder so that, when a brake pedal operates, rotation of the brake disc is stopped through the brake terminal using the brake force output by the brake force output terminal and brake is performed.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, a caliper parking brake according to the present invention will now be described more fully with reference to the accompanying drawings, in which an exemplary embodiment of the invention is shown.

Figure 1:
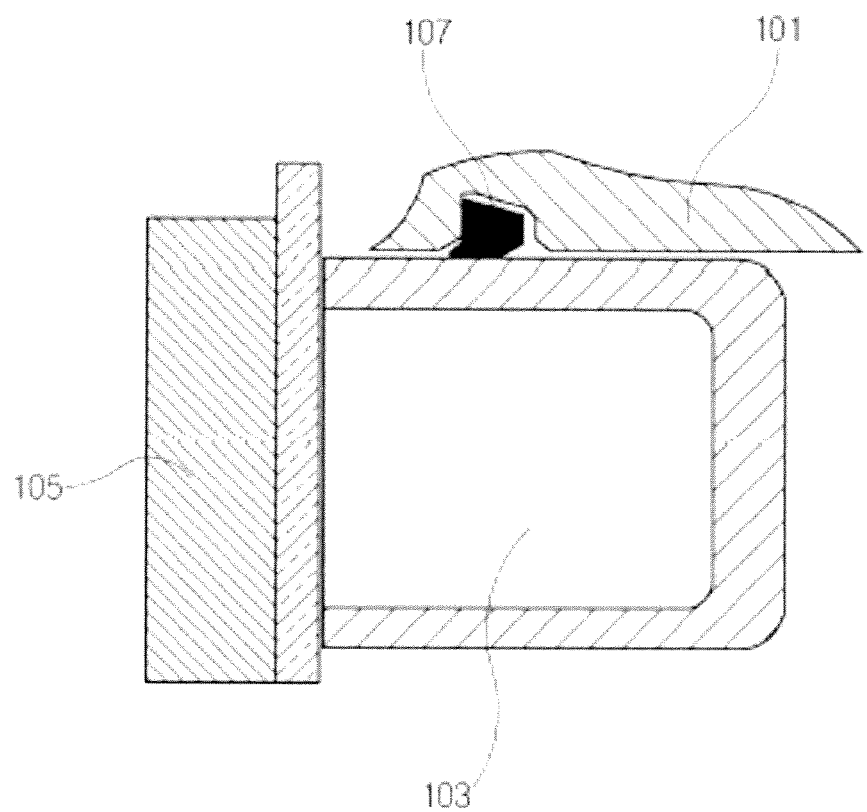
FIG. 1 is a view illustrating a caliper brake according to the related art, whereby a piston is returned to a state before brake.
Figure 2:
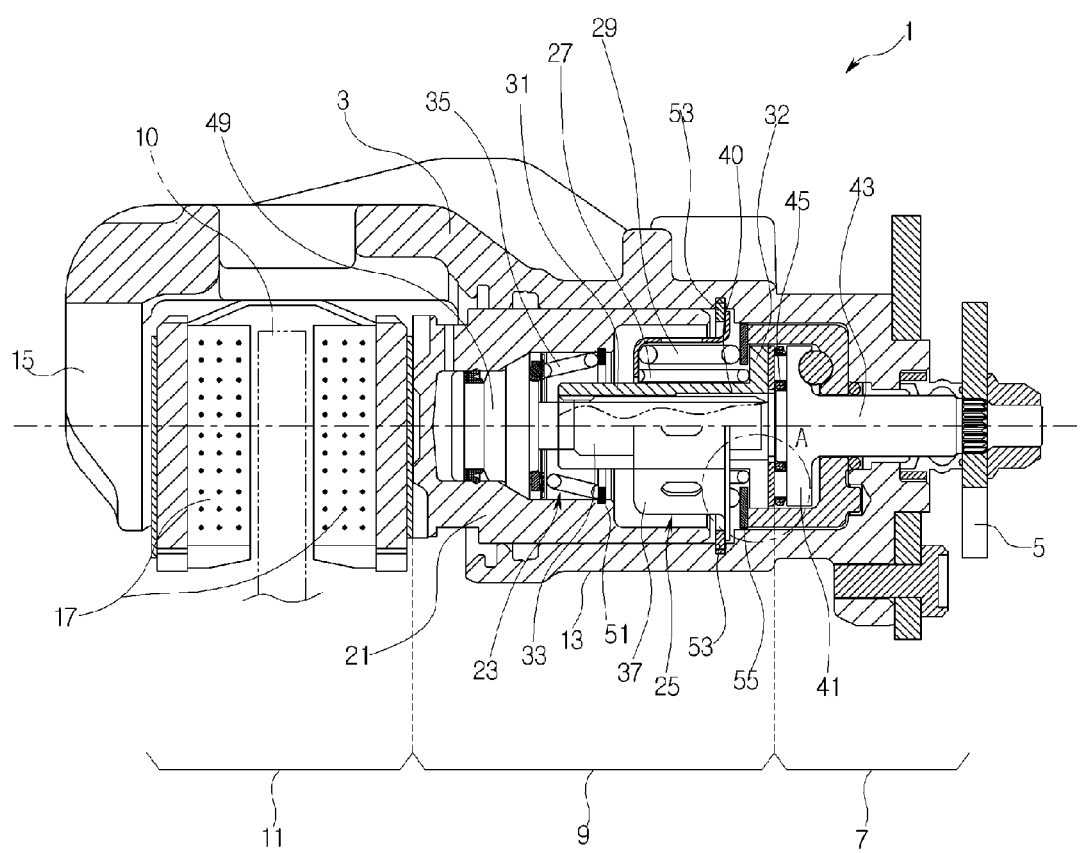
FIG. 2 is a longitudinal cross-sectional view of a caliper parking brake according to an embodiment of the present invention.
Figure 3:
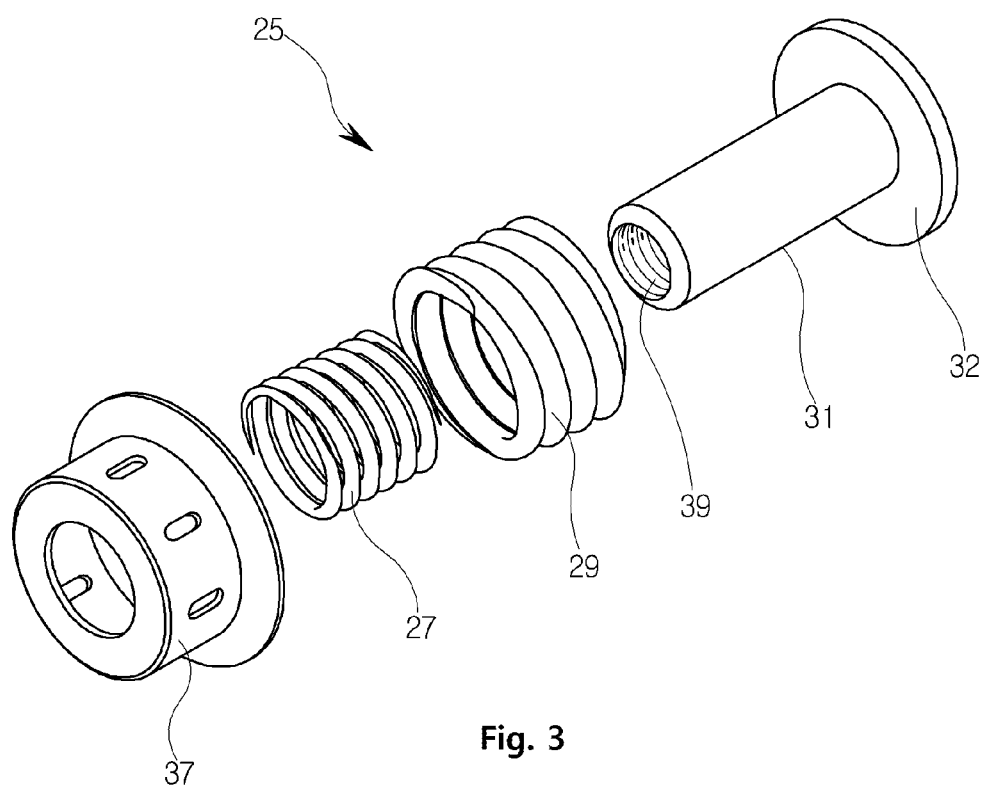
FIG. 3 is an exploded perspective view of part of a brake force output terminal illustrated in FIG. 2.
Figure 4:
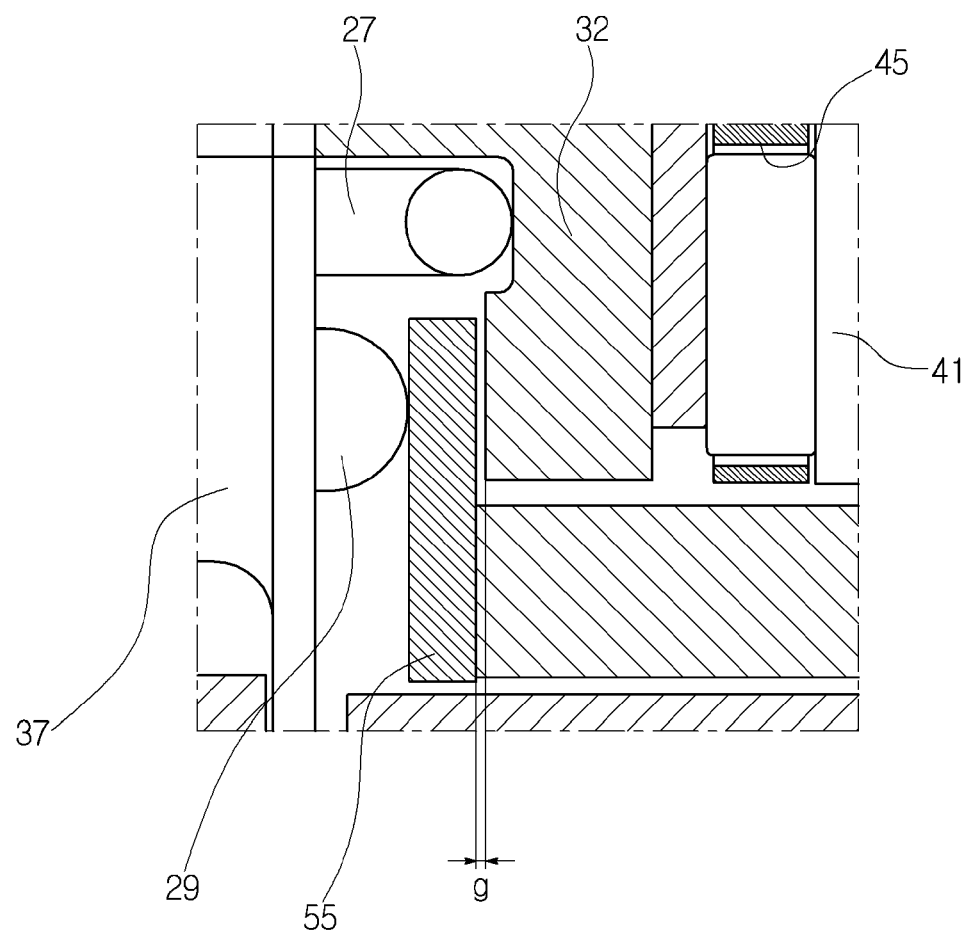
FIG. 4 is an enlarged view of a portion A of FIG. 2.
Figure 5:
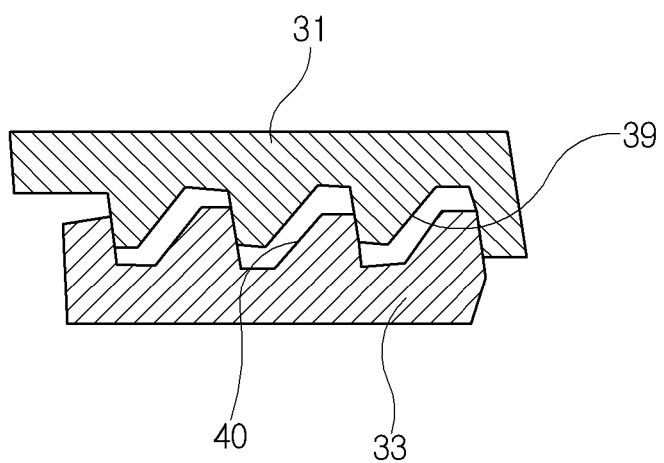
FIG. 5 is an enlarged view for illustrating one-direction screw coupling of a return pipe and an adjustment rod illustrated in FIG. 2.

FIG. 2 is a longitudinal cross-sectional view of a caliper parking brake according to an embodiment of the present invention, FIG. 3 is an exploded perspective view of part of a brake force output terminal illustrated in FIG. 2, FIG. 4 is an enlarged view of a portion A of FIG. 2, and FIG. 5 is an enlarged view for illustrating one-direction screw coupling of a return pipe and an adjustment rod illustrated in FIG. 2.

Referring to FIG. 2, a caliper parking brake 1 according to the current embodiment of the present invention includes a caliper housing 3, a brake force input terminal 5, a brake force switching terminal 7, a brake force output terminal 9, and a brake terminal 11.

Here, the caliper housing 3 constitutes the exterior of the caliper parking brake 1 and includes a cylinder 13, which is formed on a rear end of the caliper housing 3 and in which a brake force is generated and a fork 15, which is formed on a front end of the caliper housing 3 to face the cylinder 13, pressurizes a brake disc 10 and is bent in an orthogonal direction, as illustrated in FIG. 2.

The brake force input terminal 5 is a portion where an initial brake force is introduced into the caliper parking brake 1. As illustrated in FIG. 2, the brake force input terminal 5 is a brake lever that is rotatably mounted on an end of the cylinder 13 of the caliper housing 3. Thus, although not shown, a parking cable is connected to an end of the brake lever and thus the brake lever rotates around an axial line when the parking cable is pulled by a parking handle.

The brake force switching terminal 7 is a portion where a rotatative brake force introduced into the caliper parking brake 1 via the brake force input terminal 5 is switched to a straight brake force. In the present embodiment, as illustrated in FIG. 2, not only a ball in ramp (BIR) type power switching unit but also other type power switching units may be used as the brake force switching terminal 7.

In particular, in the BIR type power switching unit, the brake force switching terminal 7 includes a ramp head 41 having a front side on which an uneven surface is formed, a ramp 43 that is disposed in the center of a rear side of the ramp head 4 and is formed as a rod body that extends in an axial direction, and a ramp roller 45 that is interposed between the ramp head 41 of the ramp 43 and a rear side of a flange 32 of a return pipe 31 of the brake force output terminal 9. In this case, the ramp 43 is coupled to a rear end of the rod body that is installed within the cylinder 13 on a common axis so that the brake force input terminal 5, i.e., the brake lever rotates in synchronization with the ramp 43.

The brake force output terminal 9 is a portion where the brake force switched to the forward/backward straight motion by the brake force switching terminal 7 is output to the brake terminal 11. As illustrated in FIG. 2, the brake force output terminal 9 is directly connected to the brake force switching terminal 7 on a common axis. In particular, in the present invention, the brake force output terminal 9 compensates for abrasion that occurs in frictional pads 17 attached to opposite sides of the fork 15 and a piston 21. Thus, the abrasion compensation rod part 23 is extended so that an initial setting position of the piston 21 is moved forward by abrasion. To this end, the brake force output terminal 9 includes the piston 21, the abrasion compensation rod part 23, and a return spring part 25.

Here, the piston 21 is a portion where brake is performed while making a reciprocating motion forward and backward within the cylinder 13. As illustrated in FIG. 2, the piston 21 is mounted on a front end of the cylinder 13 so as to slide along an inner circumferential surface of the cylinder 13. Thus, when the brake force is transmitted from the brake force switching terminal 7, i.e., when a parking brake operates, the piston 21 makes a straight motion by the brake force and pressurizes and grips the brake disc 10 against the fork 15, thus performing brake.

In addition, the abrasion compensation rod part 23 is a unit for compensating for abrasion that occurs in the frictional pads 17 that are respectively attached to brake surfaces of the fork 15 and the piston 21. The abrasion compensation rod part 23 is mounted within the piston 21 on a common axis. Thus, when abrasion occurs in the frictional pads 17, the abrasion compensation rod part 23 is extended in the axial direction so that a distance at which the piston 21 moves while pressurizing the brake disc 10, increases.

To this end, the abrasion compensation rod part 23 includes the return pipe 31 that is arranged successively with the ramp 43 of the brake force switching terminal 7, an adjustment rod 33 that is screw coupled to an inside of the return pipe 31, and an abrasion compensation spring 35 that is mounted between the adjustment rod 33 and an inner circumferential surface of the piston 21, as illustrated in FIG. 2.

Here, the return pipe 31 is a cylindrical pipe body in which the flange 32 protrudes from a rear end of the return pipe 31 in a radial direction, and a female screw part 39 is processed on a front end of an inner circumferential surface of the return pipe 31, as illustrated in FIGS. 2 and 3. Thus, each screw thread of the female screw part 39 has a right-angled triangle cross-section, thus allowing a male screw part 40 of the adjustment rod 33 to rotate relative to the female screw part 39 in a direction in which the male screw part 40 moves forward but preventing the male screw part 40 of the adjustment rod 33 from rotating relative to the female screw part 39 in a direction in which the male screw part 40 retreats, as illustrated in FIG. 5. Thus, the return pipe 31 is pressurized by the ramp 43 of the brake force switching terminal 7 during brake, makes forward and elastically pressurizes the return spring part 25. In contrast, when a pressurized force caused by the ramp 43 of the brake force switching terminal 7 is released, the return pipe 31 retreats by a repulsive force of the return spring part 25 and thus is returned to a state before brake.

Also, the adjustment rod 33 is a rod body that is coupled to a front end of the return pipe 31 so as to be movable relative to the return pipe 31. The adjustment rod 33 includes a rod body that is coupled to the return pipe 31 and a hydraulic head 49 that is disposed on a front end of the rod body and is enlarged in a radial direction, as illustrated in FIG. 2.

In this case, the male screw part 40 having a right-angled triangular screw thread is processed on an outer circumferential surface of the adjustment rod 33 and thus is screw coupled to the return pipe 31 in one direction, as illustrated in FIG. 5. Thus, the adjustment rod 33 is movable relative to the return pipe 31 only in a direction which the adjustment rod 33 extends forward, by an interaction with the female screw part 39 of the return pipe 31. Thus, when the piston 21 moves forward, if a front end surface of the adjustment rod 33 is spaced apart from the inner circumferential surface of the piston 21 and thus a gap therebetween is generated, the adjustment rod 33 moves forward relative to the return pipe 31 by the gap such that the hydraulic head 49 is closely adhered to the inner circumferential surface of the piston 21. Thus, the entire length of the abrasion compensation rod part 23 increases by movement of the adjustment rod 33, i.e., by a gap between the frictional pads 17 and the brake disc 10. As a result, the piston 21 and the frictional pads 17 pressurize the brake disc 10 without any gap, thus compensating for abrasion of the frictional pads 17.

Last, the abrasion compensation spring 35 is an elastic member that allows a front end of the adjustment rod 33 to be closely adhered to the inner circumferential surface of the piston 21. A rear end of the abrasion compensation spring 35 is supported in a mounting ring 51 inserted into the inner circumferential surface of the piston 21, and a front end of the abrasion compensation spring 35 is supported on a rear side of the hydraulic head 49 of the adjustment rod 33 such that the hydraulic head 49 of the adjustment rod 33 can be elastically supported with respect to the piston 21 that is closely adhered to a front side of the hydraulic head 49 of the adjustment rod 33.

In addition, the return spring part 25 is an elastic member that allows the piston 21 to be returned to its original position before brake when a brake force exerted on the brake force output terminal 9 is released. As illustrated in FIGS. 2 and 3, the return spring part 25 is mounted in the cylinder 13 on a common axis to the abrasion compensation rod part 23. Thus, the return spring part 25 is elastically compressed when the abrasion compensation rod part 23 moves forward by a brake force transmitted from the brake force switching terminal 7 during brake, in contrast, when transmission of the brake force from the brake force switching terminal 7 is released, the return spring part 25 is elastically restored such that the abrasion compensation rod part 23 is returned to a position before brake.

To this end, the return spring part 25 according to the present invention, in particular, as illustrated in FIGS. 2 and 3, includes low-pressure and high-pressure springs 27 and 29 that are inserted in a circumference of the return pipe 31 on a common axis and are arranged in parallel inside and outside the return pipe 31, and a spring cage 37 that surrounds the low-pressure and high-pressure springs 27 and 29. Thus, the low-pressure spring 27 starts being compressed prior to the high-pressure spring 29 when the brake pressure transmitted from the brake force input terminal 5 is low, and the low-pressure and high-pressure springs 27 and 29 are simultaneously compressed when the brake pressure is high. Thus, when the low brake force is released, the piston 21 is returned to the position before brake by a restoring force of the low-pressure spring 27; however, when the high brake force is released, the piston 21 is returned to the position before brake by restoring forces of the low-pressure and high-pressure springs 27 and 29.

To this end, the spring cage 37 of the return spring part 25 constitutes the exterior of the return spring part 25 so as to surround the low-pressure and high-pressure springs 27 and 29, as illustrated in FIGS. 2 and 3. The spring cage 37 of the return spring part 25 is inserted into the circumference of the return pipe 31 on a common axis so as to fix the low-pressure and high-pressure springs 27 and 29 and thus is hung in and fixed to the inner circumferential surface of the piston 21 via a circlip 53.

Also, the low-pressure spring 27 is mounted on the circumference of the return pipe 31 on a common axis, is interposed between the flange 32 of the return pipe 31 and a bottom surface of the spring cage 37, thus applying an elastic force to the piston 21 in a direction in which forward movement of the return pipe 31 is prevented, as illustrated in FIGS. 2 and 3. The high-pressure spring 29 is also mounted on the circumference of the return pipe 31, i.e., a circumference of the low-pressure spring 27 on a common axis and applies an elastic force to the piston 21 in the direction in which forward movement of the return pipe 31 is prevented, as illustrated in FIGS. 2 and 3. Thus, the high-pressure spring 29 is mounted in the spring cage 37 in such a way that the flange 32 compresses the low-pressure spring 27, moves forward by a gap g indicated in FIG. 4 and then pressurization starts being performed by the flange 32.

To this end, the return spring part 25 according to the present invention further includes a support ring plate 55 that supports a rear end of the high-pressure spring 29, as illustrated in FIGS. 2 and 3. Thus, the support ring plate 55 is a brass coin-shaped ring body and is inserted into the circumference of the return pipe 31 on a common axis and supports the rear end of the high-pressure spring 29, as illustrated in FIGS. 2 and 4. Thus, the support ring plate 55 is configured so that, after the return pipe 31 compresses the low-pressure spring 27, moves forward by the gap g and contacts a rear side of the support ring plate 55, the support ring plate 55 is pressurized by the flange 32, moves forward and compresses the high-pressure spring 29.

Last, the brake terminal 11 is a portion where brake is directly performed on the brake disc 10. As illustrated in FIG. 2, the brake terminal 11 is disposed between the fork 15 and the brake force output terminal 9. Thus, the brake terminal 11 compresses the frictional pads 17 at front and rear sides of the brake disc 10 using the brake force output by the brake force output terminal 9 via the piston 21, thus stopping rotation of the brake disc 10 and performing brake.

In this case, the caliper parking brake 1 according to the present invention connects a brake line of a foot brake to the cylinder 13 and thus may also be used as the foot brake. Thus, the caliper parking brake 1 generates a brake force in the brake force output terminal 9 by an oil pressure of a damping oil that flows into the brake line connected to the cylinder 13 instead of the brake force switching terminal 7. Thus, the piston 21 moves forward by the brake force generated in the brake force output terminal 9 of the cylinder 13 when a brake pedal operates. As a result, the brake disc 10 is pressurized between the piston 21 and the fork 15 at the brake terminal 11 and thus rotation of the brake disc 10 is stopped and brake is performed on the brake disc 10.

Now, an operation of the caliper parking brake 1 having the above structure according to the present invention will be described as below.

If an initial driver operates the parking handle so as to perform parking brake, the parking cable is pulled by the parking handle, and the brake lever of the brake force input terminal 5 of the parking brake 1 is rotated in a direction in which the parking cable is pulled by the parking handle.

Thus, the ramp 43 of the brake force switching terminal 7 is rotated around the axial line, the uneven surface of a front end of the ramp head 41 is rotated by rotation of the ramp 43, and the ramp roller 45 moves forward/backward due to rotation of the uneven surface. As a result, rotation of the ramp 43 is switched to a straight motion by the ramp roller 45 and is output to the brake force output terminal 9.

The straight motion output by the brake force switching terminal 7 allows the abrasion compensation rod part 23 of the brake force output terminal 9 to be pressurized and to move the piston 21 forward. Thus, the brake disc 10 is pressurized between the piston 21 and the fork 15 at the brake terminal 11 and thus brake is performed on the brake disc 10.

Meanwhile, when the abrasion compensation rod part 23 is pressurized to move the piston 21 forward, the return spring part 25 that repulses the brake force output at the brake force switching terminal 7 operates according to the size of the brake force. Thus, for example, when the brake force that is input to the brake force output terminal 9 via the brake force switching terminal 7 or the brake line of the foot brake is low, the pressurized force applied to the return pipe 31 by the ramp 43 or the brake oil pressure that is exerted on the piston 21 within the cylinder 13 is small and thus only the low-pressure spring 27 is compressed by the return pipe 31. Thus, even when the brake force dissipates, the abrasion compensation rod part 23 is returned to its original position using a small force by a restoring force of the low-pressure spring 27. In this case, if the piston 21 moves forward by the foot brake, an elastic repulsive force of the abrasion compensation spring 35 is greater than that of the low-pressure spring 27. Thus, the abrasion compensation spring 35 is not compressed, and the abrasion compensation rod part 23 moves forward and compresses the low-pressure spring 27.

In contrast, when the brake force input to the brake force output terminal 9 is relatively large, the pressurized force applied to the return pipe 31 by the ramp 43 or the brake oil pressure that is exerted on the piston 21 within the cylinder 13 is large and thus not only the low-pressure spring 27 but also the high-pressure spring 29 are compressed by the return pipe 31. In this case, the return pipe 31 simultaneously compresses not only the low-pressure spring 27 that directly contacts the flange 32 but also the high-pressure spring 29 that contacts the flange 32 via the support ring plate 55 without the gap g of FIG. 4. Thus, when the brake force dissipates, the abrasion compensation rod part 23 is returned to its original position using a large force by restoring forces of the low-pressure and high-pressure springs 27 and 29. On the other hand, even when the piston 21 moves forward by the foot brake, pressure applied to the hydraulic head 49 of the adjustment rod 33 is relatively large and thus the abrasion compensation rod part 23 is maintained in a state in which the hydraulic head 49 is closely adhered to the inner circumferential surface of the piston 21 and moves forward. Thus, as described above, the low-pressure and high-pressure springs 27 and 29 are simultaneously compressed by the flange 32 of the return pipe 31.

When a gap between the brake disc 10 and the frictional pads 17 is generated by abrasion of the frictional pads 17, if a brake force is generated in the brake force output terminal 9 via the brake line of the foot brake, the piston 21 moves forward together with the abrasion compensation rod part 23 in a section of the gap g in which only the low-pressure spring 27 is compressed by the return pipe 31. However, when a resultant force of a compressed repulsive force of the abrasion compensation spring 35 and force applied to the hydraulic head 49 by the brake pressure is less than elastic repulsive forces of the low-pressure and high-pressure springs 27 and 29, only the piston 21 moves forward, and the abrasion compensation rod part 23 is maintained in its current position. Thus, space between the inner circumferential surface of the piston 21 and a front side of the hydraulic head 49 is instantaneously spaced apart from each other. Thus, due to the resultant force of the compressed repulsive force of the abrasion compensation spring 35 and force applied to the hydraulic head 49 by the brake pressure, the hydraulic head 49, the front side of which is not confined any longer, moves forward relative to the piston 21 by one-direction screw transfer from the return pipe 31 until the hydraulic head 49 contacts the inner circumferential surface of the piston 21. Thus, the hydraulic head 49 is maintained in contact with the inner circumferential surface of the piston 21 in real-time. As a result, the abrasion compensation rod part 23 is extended from the return pipe 31 to a length that increases by relative movement of the adjustment rod 33, thus compensating for abrasion of the frictional pads 17.

As described above, in a caliper parking brake according to the present invention, when a brake pressure applied to a piston by a return spring part including low-pressure and high-pressure springs is low, the piston is returned only by a restoring force of the low-pressure spring, and when the brake pressure is high, the piston is returned by restoring forces of the low-pressure and high-pressure springs so that, even when a large brake pressure is applied to the piston, the piston and a frictional pad are returned to their original positions without delay when brake is released, thus removing or reducing drag that occurs due to contact between the frictional pad and a brake disc during non-return.

In addition, when a gap between the brake disc and the frictional pad occurs due to abrasion of the frictional pad, an adjustment rod of an abrasion compensation rod part moves relative to a return pipe by a distance at which the gap is generated, so that the entire length of the abrasion compensation rod part increases. Thus, since a setting position of the piston before brake is moved forward, the brake disc is pressurized by the frictional pad without any gap so that abrasion that occurs in the frictional pad can be compensated for in real-time.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A caliper parking brake comprising:
    a caliper housing having one end on which a cylinder is formed and the other end on which a fork is formed to face the cylinder;
    a brake force input terminal that is rotatably mounted on an end of the cylinder of the caliper housing by a parking cable;
    a brake force switching terminal that is installed within the cylinder on a common axis so as to rotate together with the brake force input terminal and switches a rotatative motion caused by a brake force introduced into the brake force input terminal to a straight motion;
    a brake force output terminal that is directly connected to the brake force switching terminal on the common axis and outputs the brake force switched to the straight motion by the brake force switching terminal;
    a brake terminal that is disposed between the fork and the brake force output terminal and stops rotation of a brake disc using the brake force output by the brake force output terminal; and
    a return spring part that is disposed within the cylinder on the common axis to the abrasion compensation rod part, is elastically compressed during brake and is elastically restored while brake is released such that the abrasion compensation rod part is returned to its original position before brake,
    wherein the brake force output terminal compensates for abrasion that occurs in the fork and a frictional pad of the piston by moving an initial position of the piston forward, and
    wherein the return spring part comprises low-pressure and high-pressure springs that are arranged in parallel on the common axis, and when a brake pressure transmitted from the brake force input terminal is low, the low-pressure spring is compressed, when the brake pressure is high, the low-pressure and high-pressure springs are compressed, and when brake is released, the piston is returned to a position before brake by an elastic repulsive force of the low-pressure spring or elastic repulsive forces of the low-pressure and high-pressure springs.

2. The caliper parking brake of claim 1, wherein the brake force output terminal comprises:
    a piston that is mounted on a front end of the cylinder and pressurizes the brake disc against the fork by the straight motion transmitted from the brake force switching terminal during brake so as to perform brake; and
    an abrasion compensation rod part that is mounted within the piston on the common axis, extends in an axial direction when abrasion occurs in the fork and the frictional pad of the piston and increases a distance at which the piston pressurizes the brake disc and moves, so as to compensate for abrasion.

3. The caliper parking brake of claim 2, wherein the abrasion compensation rod part comprises:
    a return pipe that elastically compresses the return spring part and moves forward when the return pipe is pressurized by the brake force switching terminal and is returned to a state before pressurization by a repulsive force of the return spring part when a pressurized force caused by the brake force switching terminal is released;
    an adjustment rod that is one-direction screw coupled to a front end of the return pipe so as to move relative to the return pipe only in an extension direction, if, as the piston moves forward, a gap between a front end surface of the adjustment rod and an inner circumferential surface of the piston is generated, moves forward from the return pipe by the gap; and
    an abrasion compensation spring, a rear end of which is hung in the inner circumferential surface of the piston, a front end of which is hung in the adjustment rod so as to elastically support the adjustment rod with respect to the piston such that a front end of the adjustment rod is closely adhered to the inner circumferential surface of the piston.

4. The caliper parking brake of claim 3, wherein the return spring part comprises:
    a spring cage that constitutes an exterior of the return spring part, is inserted into an outer circumference of the return pipe on the common axis and is hung in and fixed to the inner circumferential surface of the piston;
    the low-pressure spring that is mounted on the common axis to the return pipe so as to be interposed between a flange of the return pipe and a bottom surface of the spring cage; and
    the high-pressure spring that is inserted into a circumference of the low-pressure spring on the common axis, is mounted between the flange and the spring cage and is configured in such a way that the flange compresses the low-pressure spring, moves forward by a gap and then pressurization starts being performed by the flange.

5. The caliper parking brake of claim 4, further comprising a support ring plate that is inserted into an outer circumference of the return spring on the common axis, supports a rear end of the high-pressure spring and starts being pressurized by the flange when contacting the flange that compresses the low-pressure spring and moves forward by the gap.

6. The caliper parking brake of claim 5, wherein the caliper parking brake is used as a foot brake by connecting a brake line of the foot brake to the cylinder so that, when a brake pedal operates, rotation of the brake disc is stopped through the brake terminal using the brake force output by the brake force output terminal and brake is performed.

7. The caliper parking brake of claim 2, wherein the caliper parking brake is used as a foot brake by connecting a brake line of the foot brake to the cylinder so that, when a brake pedal operates, rotation of the brake disc is stopped through the brake terminal using the brake force output by the brake force output terminal and brake is performed.

8. The caliper parking brake of claim 3, wherein the caliper parking brake is used as a foot brake by connecting a brake line of the foot brake to the cylinder so that, when a brake pedal operates, rotation of the brake disc is stopped through the brake terminal using the brake force output by the brake force output terminal and brake is performed.

9. The caliper parking brake of claim 1, wherein the caliper parking brake is used as a foot brake by connecting a brake line of the foot brake to the cylinder so that, when a brake pedal operates, rotation of the brake disc is stopped through the brake terminal using the brake force output by the brake force output terminal and brake is performed.

* * * * *